United States Patent [19]

Nakazawa et al.

[11] Patent Number: 5,448,435
[45] Date of Patent: Sep. 5, 1995

[54] DISC DRIVE MAGNETIC LATCH HAVING PERMANENT MAGNET AND ELECTROMAGNET

[75] Inventors: Hiroshi Nakazawa; Hideki Nishimoto; Tatsutoshi Nagasaki, all of Kawasaki, Japan

[73] Assignee: Fuji Electric Co., Ltd., Kanagawa, Japan

[21] Appl. No.: 756,564

[22] Filed: Sep. 11, 1991

[30] Foreign Application Priority Data

Sep. 12, 1990 [JP] Japan ................................. 2-241395
Feb. 14, 1991 [JP] Japan ................................. 3-020230
May 23, 1991 [JP] Japan ................................. 3-117754

[51] Int. Cl.6 .......................... G11B 5/54; G11B 21/22
[52] U.S. Cl. ....................................... 360/105; 360/75
[58] Field of Search ................... 360/75, 97.01, 78.12, 360/104, 105, 106

[56] References Cited

U.S. PATENT DOCUMENTS

| | | | |
|---|---|---|---|
| 3,671,893 | 6/1972 | Edgar et al. | 335/179 |
| 4,881,139 | 11/1989 | Hazebrouck | 360/105 |
| 4,890,176 | 12/1989 | Casey et al. | 360/105 |
| 4,985,793 | 1/1991 | Anderson | 360/105 |
| 5,023,736 | 6/1991 | Kelsic et al. | 360/105 |
| 5,124,867 | 6/1992 | Kitahori et al. | 360/105 |
| 5,170,300 | 12/1992 | Stefansky | 360/105 |
| 5,187,627 | 2/1993 | Hickox et al. | 360/105 |
| 5,208,713 | 5/1993 | Lindsay et al. | 360/105 |
| 5,216,662 | 6/1993 | Stafansky et al. | 360/105 |
| 5,231,556 | 7/1993 | Blanks | 360/105 |
| 5,361,182 | 11/1994 | Sampietro et al. | 360/105 |

*Primary Examiner*—William L. Sikes
*Assistant Examiner*—Tai V. Duong
*Attorney, Agent, or Firm*—Spencer, Frank & Schneider

[57] ABSTRACT

A disc drive for performing writing information on and/or reading out information from a disc has a head, a movable member, a driving device, a restriction device and a release device. The head writes information on and/or reads out information from the disc. The movable member supports the head. The driving device moves the movable member. The restriction device fixes the movable member in a predetermined position in a moving path of the movable member by using a magnetic attractive force. The release device releases the movable member from the fixed state at the predetermined position by using a magnetic repelling force.

6 Claims, 5 Drawing Sheets

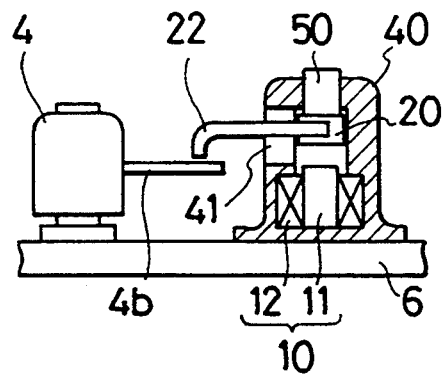
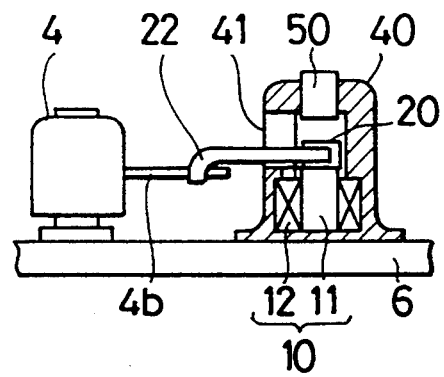
FIG. 6A    FIG. 6B
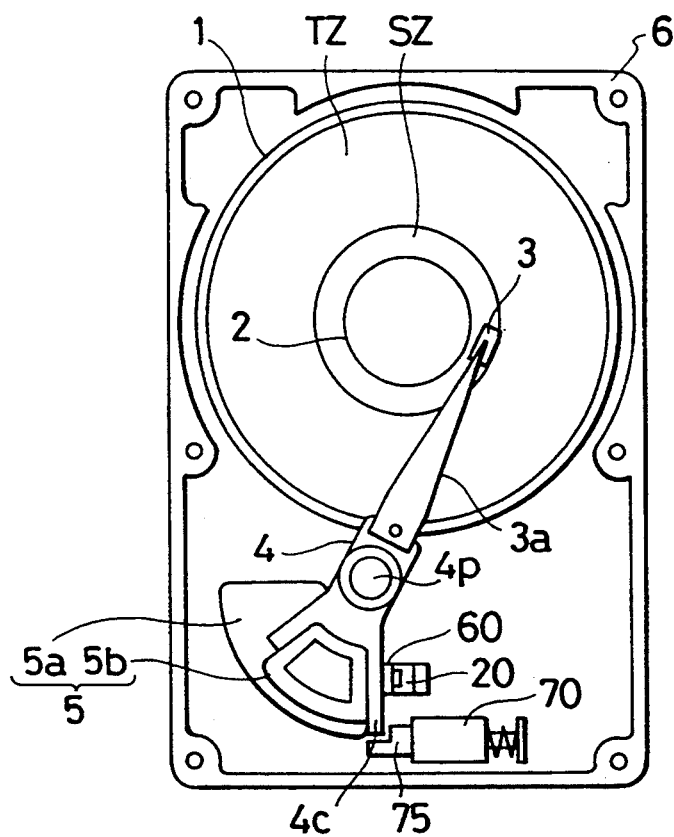
FIG. 7

DISC DRIVE MAGNETIC LATCH HAVING PERMANENT MAGNET AND ELECTROMAGNET

BACKGROUND OF THE INVENTION

1. Field of the Invention

The present invention relates to a disc drive used as an external storage device for an office automation machine, a personal computer and so on, and in particular, this invention is directed to a disc drive which has a restriction mechanism for restricting the location of a movable member to a designated position. The restriction mechanism restricts the movable member, such as a swing arm for supporting a head for reading and writing information in the disc drive when the electric power supply to the disc drive is interrupted and the disc drive is transported.

2. Description of the Prior Art

A requirement of portability for office automation machines and personal computers has recently emerged. Lap-top machines are good examples of answers to this requirement. In accordance with this trend in such computer systems, a disc drive, which is installed inside or connected outside a computer or office automation machine, needs to be provided with a structure for coping with vibrations and shocks during transportation of the disc drive in addition to having a mass-storage capability and short access time.

In a prior art disc drive comprising a well-known structure for coping with vibration and shock when the disc drive is out of service, a head for reading and writing information on a disc is moved to and restricted at a shipping position where no information is recorded on the disc. The disc drive is, however, subjected to a large number amount of vibrations and shocks during transportation of the disc drive. Accordingly, there may be a case in which the restriction mechanism fails to lock the head at a designated shipping position so that the head collides with and scratches the surface of the disc. As for a fixed disc drive having a head which is floated on the surface of the disc by the force of air caused by rotation of the disc, the head makes contact with the surface of the disc while the fixed disc drive is out of service or in transportation. If the head is released from the restricting mechanism when the fixed disc drive is out of service or in transportation, and the head is moved from the restriction position, the surface of the disc may be damaged as a result of being scratched by the head.

In order to establish a small-sized disc drive having a lightweight and which provides a high speed access, a recent type of disc drive often uses a mechanism in which the head is supported by a swing arm and a voice coil motor moves the swing arm. This mechanism takes advantage of lower mechanical friction and higher precision in positioning the head on the disc. On the other hand, the restricting mechanism of the swing arm tends to be subjected to a small amount of vibration and shock applied to the disc drive, so that the arm is released from the restricting mechanism.

In some prior art disc drives, there are various kinds of structures and mechanisms for restricting the head at a designated position when the disc drive is out of service, handled in transportation or used during an unexpected loss of the electric power source. Now referring to FIGS. 1A, 1B and 1C, some examples of these prior art disc drives will be described. FIGS. 1A, 1B and 1C refer to fixed disc drives in which a disc 1 is driven at a constant rotational speed by an outer-rotor-type spindle motor 2 mounted on a case 6 of the disc drive. A head 3 for reading and writing information on a track zone TZ of the surface of the disc 1 is supported by one end of a swing arm 4 as a movable member. The arm 4 is rotating around a pivot axis 4p provided on the case 6. An actuator 5 for moving the arm 4 and locating the head 3 on the disc 1 is composed of a voice coil motor. The voice coil motor is composed of a fixed part 5a fixed to the case 6 and a movable part 5b which is formed by a voice coil and attached to the other end of the arm 4. A restriction mechanism of the arm 4 fixes the head 3 on a shipping zone SZ which is ordinarily formed at the inner region of the surface of the disc 1, when the disc drive is out of service and so on.

In the prior art disc drive shown in FIG. 1A, the restriction device has a coil spring 31 extended between a predetermined position on the side of the head 3 of the pivot axis 4p on the arm 4 and a support member 6a provided on the case 6. During operation of the disc drive, the actuator 5 applies a force against the coil spring 31 and moves the arm 4 in order to locate the head 3 within the track zone TZ. When the disc drive is out of service or used during an unexpected loss of the electric power supply, the electric power supply to the actuator 5 is also lost and the actuator 5 is inactivated, and then the arm 4 rotates counterclockwise due to the tension force by the coil spring 31 and a portion of the arm 4 collides with a stopper 4a. At this point, the arm 4 is stopped and the head 3 is fixed at the shipping zone SZ.

In the prior art disc drive shown in FIG. 1B, the restriction device has an electromagnet operator 32 on the case 6 and a linking portion 33 provided on the arm 4. In order to move the head 3 to the shipping zone SZ when the electric power supply to the actuator 5 is lost, by counter electromotive force of inertially rotating spindle motor 2, the actuator 5 is driven to move the arm 4 until it contacts the stopper 4a. As a result, a linking portion 32a of the electromagnet operator 32 and the linking portion 33 are linked to each other and the head 3 can be fixed in the shipping zone SZ.

In the prior art disc drive shown in FIG. 1C, a permanent magnet 34 fixed to the case 6 attracts a piece of magnetic substance 35 mounted on the arm 4 so that the head 3 can be fixed in the shipping zone SZ. In the same manner as the disc drive of FIG. 1B, the actuator 5 is driven to move the arm 4 to the fixed position by use of generated electric power by inertially rotating spindle motor 2 after loss of the electric power supply. In this example, the permanent magnet 34 is used also as a stopper. Thus, the permanent magnet 34 is supported by a support member 37 fixed to the case 6 through an elastic member 36 composed of a material such as rubber.

There are, however, some problems in the above mentioned prior art disc drives.

More specifically, in the example shown in FIG. 1A, in order to place the head 3 within the track zone TZ while operating the disc drive, it is required to supply electric power to the actuator 5 so as to generate enough torque to balance the tension force of the coil spring 31. This leads to a problem in that the power consumption of the disc drive increases. Additionally, since the arm 4 is only fixed by the force generated by the coil spring 31, the head 3 is apt to vibrate when a relatively large force is applied to the arm 4. Increase the tension force of the coil spring 31 in order to reduce the vibrating effect leads to an increase in power consumption.

In the example shown in FIG. 1B, although the problem relating to power consumption occurring in the previous example is not present, there is a problem with mechanical friction between the linking part 32a and the linking part 33. This means that alternating between a restriction work mode and a release work mode makes the contacting points of these linking parts wear out causing the restriction work mode to become unstable. And furthermore, as the electromagnet operator 32 is required to be activated electrically during operation so that the linking part 32a may be apart from the linking part 32, there is a slight increase in power consumption.

In the example shown in FIG. 1C, there is no problem regarding either power consumption or mechanical wearing. In releasing the arm 4 from the restriction state, the piece 35 is required to be removed from the permanent magnet 34 by making the actuator 5 generate a large force. Thus, the arm 4 in a release work mode tends to rebound after colliding with a stopper or the like provided on the side of the magnet 35. As a result, the leaf spring 3a vibrates so that the head 3 can make contact with the surface of the disc 1 to scratch it. In order and avoid such failures, there is no effective way except to reduce the restriction force developed between the permanent magnet 34 and the piece 35. Thus, under this situation, a stable restriction work mode can not be established.

SUMMARY OF THE INVENTION

An object of the present invention is to provide a disc drive having a restriction device for locating a head, the head being for reading and writing information onto a disc, onto a designated position by means of restricting a movable object such as a swing arm for supporting and moving the head, the restriction device having a sufficient amount of restriction force, consuming a lesser amount of electric power for removing a restriction force, and causing a lesser amount of mechanical wearing in a restriction movement of mechanical components.

For that purpose, in a first aspect of the present invention, a disc drive for performing writing information on and/or reading out information from a disc comprises:

a head for writing information on and/or reading out information from the disc;

a movable member being movable in two directions and being for supporting the head;

a driving means for moving the movable member;

a restriction means for fixing the movable member in a predetermined position in a moving path of the movable member by using a magnetic attractive force which acts in one of the moving directions of the movable member moved by the driving means; and a release means for releasing the movable member from a fixed state at the predetermined position by using a magnetic repelling force that acts in the other direction of the moving directions.

In a second aspect of the present invention, a disc drive for performing writing information on and/or reading out information from a disc comprises:

a head for writing information on and/or reading out information from the disc;

a movable member for supporting the head;

a driving means for moving the movable member;

one object of a permanent magnet or an electromagnet mounted on the movable member; and the other object of an electromagnet or a permanent magnet correspondingly mounted on a fix part of the disc drive in correspondence to a predetermined position in a moving path of the movable member and being able to be attracted to one object of the permanent magnet or the electromagnet respectively by a magnetic attractive force;

wherein the driving means moves the movable member to the predetermined position by a counter electromotive force generated from a motor used for rotating the disc when the electric power supply to the disc drive is stopped, the movable member is fixed at the designated position by a magnetic attractive force developed between the permanent magnet and the electromagnet in a magnetically inactivated state of the electromagnet mounted on either the movable member or the fix part, and the movable member is released from the predetermined position by activating magnetically the electromagnet so as to develop a magnetic repelling force between the permanent magnet and the electromagnet.

In a third aspect of the present invention, a disc drive for performing writing information on and/or reading out information from a disc comprises:

a head for writing information on and/or reading out information from the disc;

a movable member for supporting the head;

a driving means for moving the movable member;

an electromagnet mounted on a fix part of the disc drive; and a permanent magnet mounted to be movable in relative to the electromagnet, the permanent magnet having a linking part being able to link with the movable member in a predetermined position in a moving path of the movable member;

wherein the electromagnet and the permanent magnet are contacted to each other by a magnetic attractive force developed between the permanent magnet and the electromagnet in an electromagnetically inactivated state of the electromagnet so that the linking part is linked to the movable member by and fixed at the predetermined position, and the linkage between the linking part and the movable member is released by activating magnetically the electromagnet so as to develop a magnetic repelling force between the permanent magnet and the electromagnet, so that the movable member is released from the predetermined position.

In a fourth aspect of the present invention, a disc drive for performing writing information on and/or reading out information from a disc comprises:

a head for writing information on and/or reading out information from the disc;

a movable member for supporting the head;

a driving means for moving the movable member;

a permanent magnet mounted on one of the movable member or one fixed part of the disc drive;

a magnetic attractive member mounted on the other of the movable member or the other fixed part of the disc drive, the magnetic attractive member being able to be linked with the permanent magnet by a magnetic attractive force at a predetermined position in a moving path of the movable member;

an operating member mounted to be able to move to a position where the operating member is able to link with the movable member; and an electromagnetic means having an electromagnet for moving the operating member by a magnetic force generated by the electromagnet;

wherein the permanent magnet and the magnetic attractive member are contacted to each other by a magnetic attractive force developed between the permanent magnet and the magnetic attractive member, so that the movable member is fixed at the designated position, the movable member and the operation member are linked by moving the operating member by activating magnetically the electromagnet, so that the movable member is released from the predetermined position.

A disc drive device of the present invention has a passive mechanism for releasing the arm for moving the head so there is no need for releasing the arm by means of such an actuator as formed in the prior art shown in FIG. 1C, and hence, it will appreciated that extreme vibration and shock never occurs at the arm in a release work mode. As a result, it will be appreciated that the restriction force for the arm may be taken to be large enough without any limitation on controlling the released arm movement. Additionally, it will appreciated that a smooth movement of the arm is established in a release work mode. There is no need for making the actuator generate an excessive force to balance the tension force developed by the spring coil as in the prior art shown in FIG. 1A. And furthermore, it will be appreciated that the electric power consumption of the disc drive is negligible because electromagnets used for the release work mode are activated electrically for a short period of time only when in the release work mode. In addition, there are no wearing parts in the disc drive of the present invention, and the good features of a release work mode and a restriction work mode of the restriction device may be maintained during the life time of the disc drive.

A disc drive having the above mentioned features of the present invention will be highly appreciated to be a small-sized and lightweight fixed disc drive to be installed in an office automation machine and a personal computer mainly used as a portable apparatus. So far, the disc drive of the present invention brings the features of anti-vibration and anti-shock mechanism, long life usage of electric power batteries, and long-term reliability of the overall components of the disc drive.

The above and other objects, effects, features and advantages of the present invention will become more apparent from the following description of embodiments thereof taken in conjunction with the accompanying drawings.

BRIEF DESCRIPTION OF THE DRAWINGS

Embodiments of the present invention will now be described, by way of example and with reference to the accompanying drawings in which like parts are designated with like numerals throughout, and in which:

FIGS. 1A, 1B and 10 are plan views of a prior art disc drive wherein each disc drive has a different restriction mechanism;

FIGS. 6A and 6B are side views illustrating modified examples of the restriction device of the disc drive shown in FIG. 4, FIGS. 6A and 6B showing the release state and the restriction state of the restriction device, respectively;

FIG. 7 is a plan view of a disc drive having a further embodiment of a restriction device of the present invention.

DETAILED DESCRIPTION OF PREFERRED EMBODIMENTS

The present invention will be described hereinafter in detail with respect to preferred embodiments, and it will become apparent to those skilled in the art that changes and modifications may be made without departing from the invention in its broader aspects.

Figure 1A:
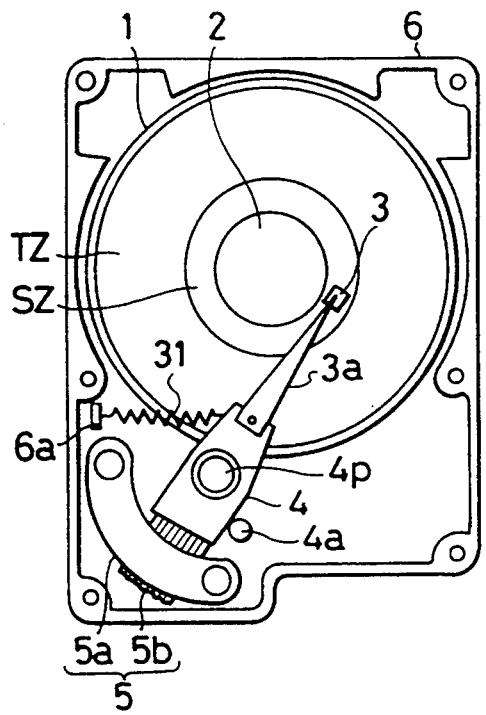
Figure 1B:
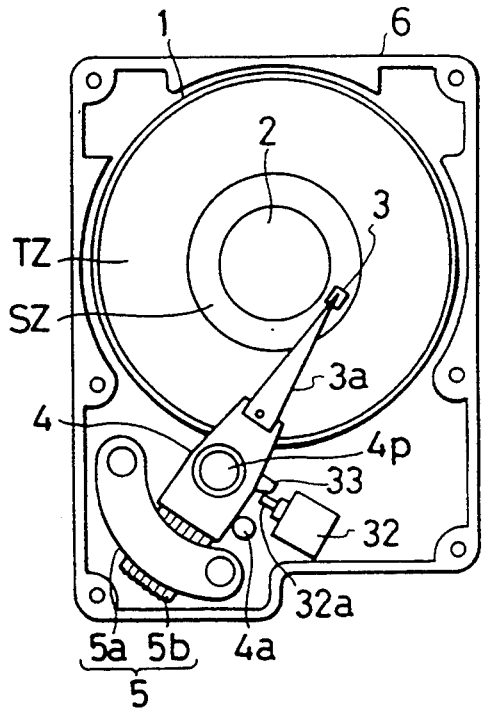
Figure 1C:
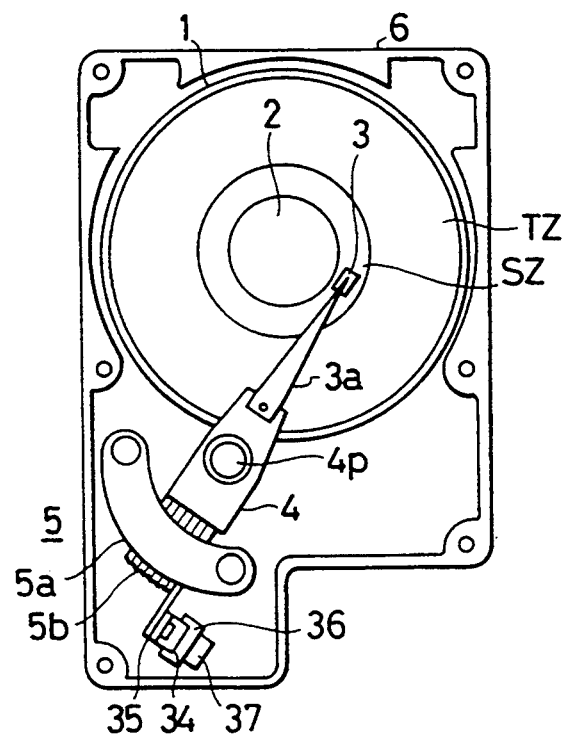
Figure 2:
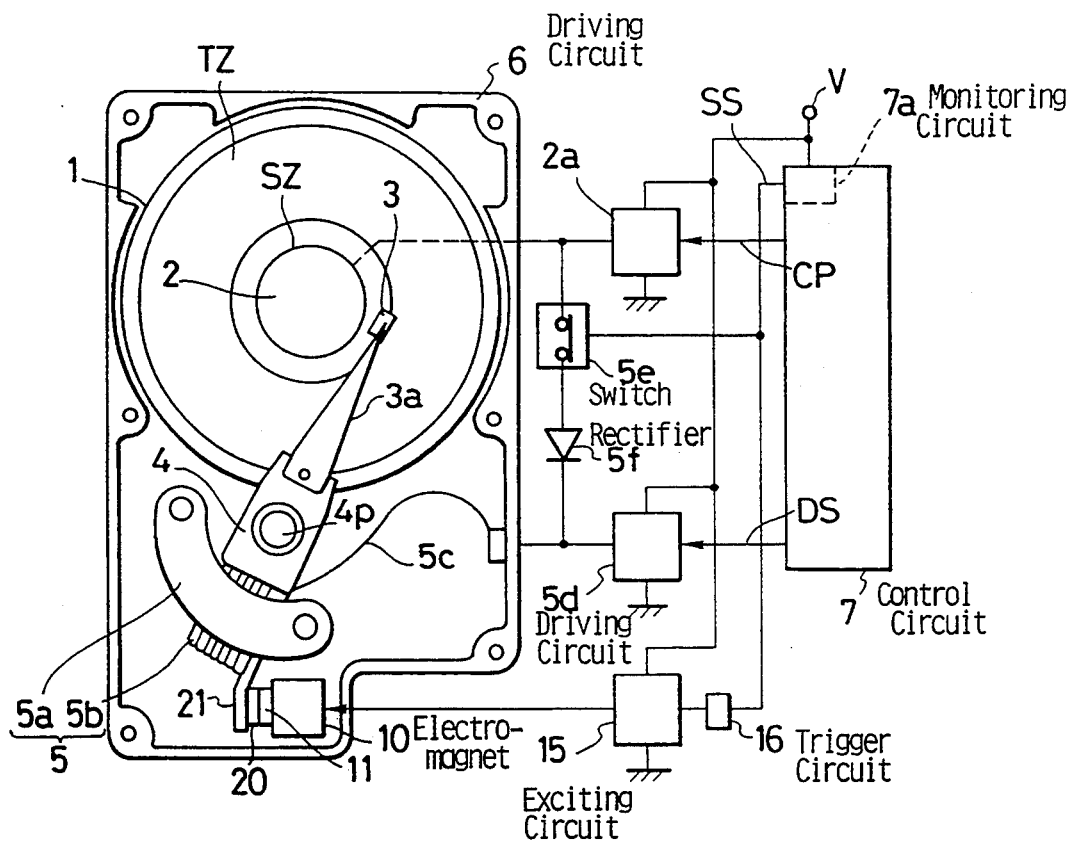
FIG. 2 is a diagram illustrating a disc drive having one embodiment of a restriction device and its attached electric circuitry of the present invention.
Figure 3A:
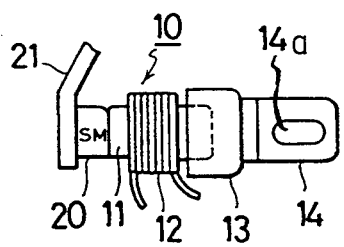
FIGS. 3A and 3B are plan views illustrating the restriction device of the disc drive shown in FIG. 2.
Figure 3B:
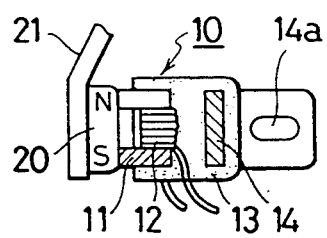
Figure 8A:
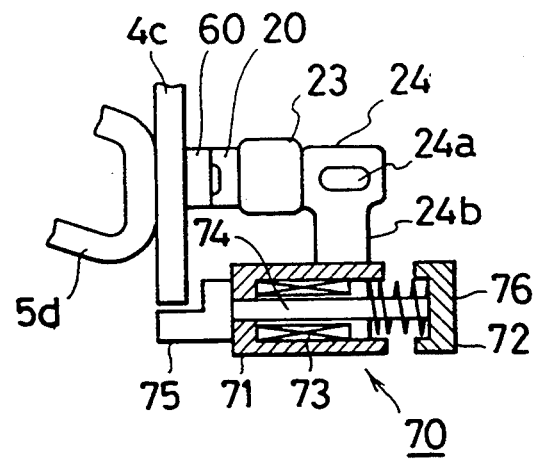
FIGS. 8A and 8B are side views illustrating the restriction device in the disc drive as shown in FIG. 7, FIGS. 8A and 8B showing the release state and the restriction state of the restriction device, respectively.
Figure 8B:
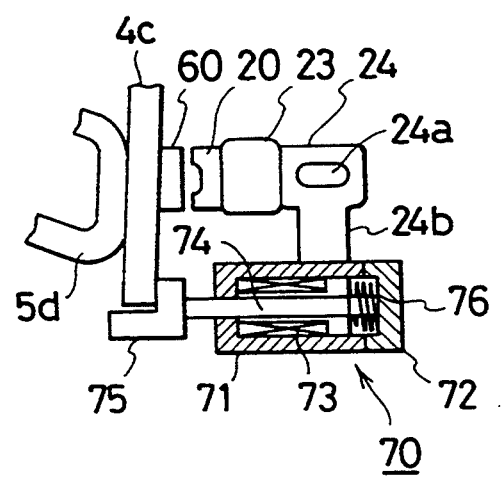

FIGS. 2, 3A and 3B show the first embodiment of the present invention, FIGS. 4, 5A, 5B, 6A and 6B show the second embodiment of the present invention and FIGS. 7, 8A and 8B show the third embodiment of the present invention respectively. In these figures, like parts are designated with like numerals identical to parts in FIGS. 1A, 1B and 1C. In every embodiment, it is assumed that the disc drive is a small-sized fixed disc drive having a disc of a diameter, for example, 2.5 inches, suitable for portable computers and that the movable object is a swing arm.

In the first embodiment of the present invention as shown in FIG. 2, a fixing part of a restriction device is formed by an electromagnet 10 fixed to a case 6. One end of an iron core 11 projects from the electromagnet 10. A moving part of the restriction device corresponding to the fixing part is formed by a permanent magnet 20. The permanent magnet 20 is fixed on a swing arm 4 for supporting a head 3 used for writing and reading information on a disc 1. The position of the permanent magnet 20 on the arm 4 is selected to be as far as possible from a pivot point, that is, a pivot axis 4p. In this embodiment, the permanent magnet 20 is fixed on an attaching member 21 extended from a movable part 5b of an actuator 5. The movable part 5b is provided at the one end of the arm 4. Thus, by locating the moving part of the restriction device as far as possible from the pivot axis 4p of the arm 4, it is possible to restrict the movement of the arm 4 by using a smaller restriction force.

In FIGS. 3A and 3B, two examples are shown with respect to a specific structure of the electromagnet 10 and the permanent magnet 20. A magnetic material such as soft iron is used for the iron core 11 of the electromagnet 10. As shown in FIG. 3A, a small and simplified configuration may be used for the electromagnet 10 where a coil 12 is turned around the iron core 11 formed in the shape of a rod. In the embodiment shown in FIG. 2, the iron core 11 is also used as a stopper for the movement of the arm 4. Owing to this, the electromagnet 10 is linked to a mount fitting 14 through an elastic member 13 such as soft rubber and so on. The mount fitting 14 is screwed on the case 6 by a screw, not shown here, penetrating an elongate groove 14a. By adjusting the position of the mount fitting 14 in relative to the screw, the position of the iron core 11 can be adjusted to a desirable position. In the example shown in FIG. 3A, the small-sized ferrite magnet is used as the permanent magnet 20 and a magnetization direction of the permanent magnet 20 and the axis of the iron core 11 are parallel.

In the structure shown in FIG. 3B, an iron core 11 of an electromagnet 10 is formed to be U-shaped and a coil 12 is turned around the iron core 11. A part of the iron core 11 is molded in an elastic member 13 so as to be linked to a mount fitting 14. Two poles of the U-shaped iron core 11 are extended outside the elastic member 13. In the same manner as FIG. 3A, both poles of the iron core 11 are also used as stoppers for the movement of the arm 4 and the position of the iron core 11 is set to a desirable position by adjusting the position of the mount fitting 14 relative to the screw fixed on the case 6. Also as shown in FIG. 3B, a permanent magnet 20 contacts both poles of the iron core 11. The force developed between the U-shaped iron core 11 and the permanent magnet 20 shown in FIG. 3B is greater than the force developed in the magnet configuration shown in FIG. 3A. Thus, the restriction capability of the restriction device with respect to the arm 4 is higher in FIG. 3B.

Now referring to FIG. 2 again and further to the electric circuitry, the restriction and release mechanism of the restriction device will be described. A driving circuit 2a for a spindle motor 2 is mounted in the disc drive. The driving circuit 2a receives a clock pulse CP from a control circuit 7 having a microprocessor, and drives the spindle motor 2 so that the disc 1 may be rotating constantly at a designated rotating speed.

The movable member 5b of the actuator 5 is connected to a driving circuit 5d for the actuator 5 through a flexible lead line 5c. The driving circuit 5d, receiving a driving command signal DS from the control circuit 7, drives the actuator 5 so that a head 3 is moved to a designated position according to the driving command signal DS. As shown in FIG. 2, a coil forming the movable member 5b of the actuator 5 is electrically connected to the spindle motor 2 through the flexible lead line 5c, a switch 5e and a rectifier 5f. With respect to the electromagnet 10 forming the restriction device, an exciting circuit 15 is connected. The exciting circuit 15 is, for example, a charge and discharge circuit using capacitors. The exciting circuit 15 can supply a large amount of exciting current to the electromagnet 10 by receiving an electrical power input (voltage V) which is commonly supplied also to the driving circuits 2a and 5d and the control circuit 7, and discharging the charge stored in the capacitors within a short time interval. The control circuit 7 receives an electrical power input (voltage V) through a voltage monitoring circuit 7a. The control circuit 7 generates a monitor signal SS from the voltage monitoring circuit 7a. When the input voltage V is greater than a designated voltage value the monitor signal SS is "high" and the generated monitor signal SS is supplied into the above mentioned switch 5e and a trigger circuit 16 attached to the exciting circuit 15.

In a disc drive with the circuit configuration described above, when the electric power input V is lost in stopping the disc drive or in case of an unexpected loss of the electric power source, the value of the monitor signal SS from the voltage monitoring circuit 7a changes into a "low" state and the switch 5e closes promptly. Furthermore, an AC counter electromotive force generated by the spindle motor 2, still rotating by inertia, is rectified by the rectifier 5f and the rectified DC current is supplied to the movable member 5b of the actuator 5. After that, the arm 4 swings in the direction in which the permanent magnet 20 makes contact with the iron core 11. Thus, as shown in FIG. 2, the head 3 is moved in a shipping zone SZ on the disc 1, and the permanent magnet 20 and the iron core 11 of the electromagnet 10 to which an electric power source is not supplied any more are attracted and contacted to each other, and the arm 4 is fixed at the position shown in FIG. 2.

More specifically, after the contacting of the permanent magnet 20 with the iron core 11, the force which makes the arm 4 swing is effective for a while, thus, the shift to the restriction state which uses the above described attraction force is positively carried out. An elastic member 13 as shown in FIGS. 3A and 3B is used for reducing the impact between the permanent magnet 20 and the iron core 11 and for preventing those magnets from rebounding when contacting each other. As a result, owing to the elastic member 13, the above mentioned restriction action of the magnets 10 and 20 and the arm 4 can be established securely.

When the electric power source V is supplied to the disc drive, in order to operate the disc drive, the monitor signal SS from the voltage monitoring circuit 7a is switched to a "high" state. This leads to opening of the switch 5e from next separating electrically of the actuator 5 from the spindle motor 2. At the same time, the monitor signal SS activates the exciting circuit 15 via the trigger circuit 16, and for example, by discharging the stored charge in the capacitors in the exciting circuit 15, a relatively large amount of exciting current is supplied to the electromagnet 10 in a short period of time. The direction of this exciting current supplied to the electromagnet 10 is such that the permanent 20 and the iron core 11 repel each other. Thus, the arm 4 is released from the above mentioned restriction state. The trigger circuit 16 may be formed by a one-shot pulse circuit and installed within the exciting circuit 15.

The above mentioned releasing active of the arm 4 is performed securely within a short period of time. Then, promptly after the electric power supply is established, by means of transferring the driving command signal DS from the control circuit 7 to the driving circuit 5d for the actuator 5 so that the arm 4 is moved from the released position by the actuator 5 to a designated position, the head 3 can be smoothly positioned to a desirable position in a track zone TZ on the disc 1.

As the repulsive force developed between the iron core 11 and the permanent magnet 20 in the above mentioned release action reduces sharply as the distance between these magnets increases, there is not any fear that the arm 4 will swing in an extreme manner away due to the repulsive force. As there is no need to release the arm 4 by using the driving force of the actuator 5, the driving command signal DS from the control circuit 7 at the beginning of the operation of the disc drive may be taken so as to specify a small amount of driving force which is enough for moving the head 3 to a desirable position. Thus, in comparing the prior art device shown in FIG. 1C, the movement of the arm 4 is smoother when in the at release mode, and it will be appreciated that the head 3 may be moved to a designated position within a relatively short period of time without an extra movement of the arm 4.

Next, referring to FIGS. 4, 5A and 5B, the second embodiment of the present invention will be described.

Figure 4:
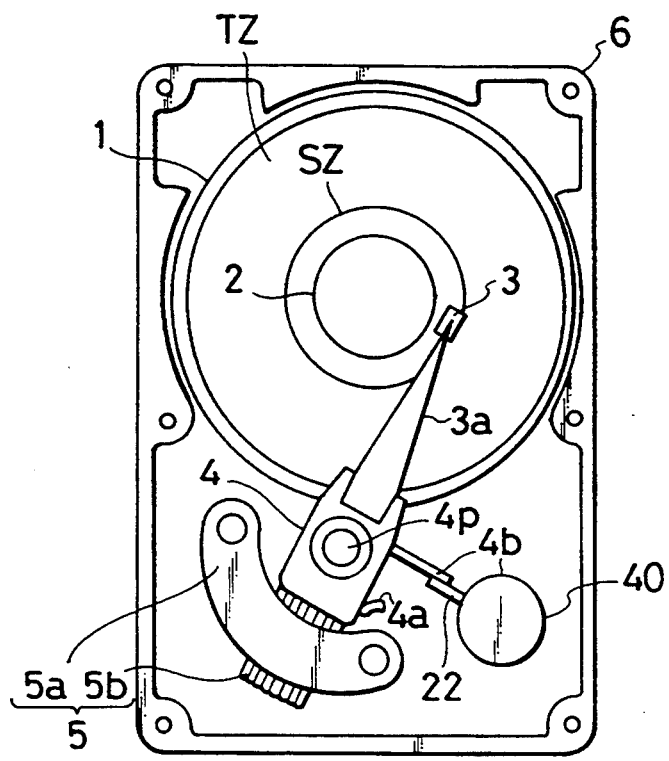
FIG. 4 is a plan view of the a drive having another embodiment of restriction device of the present invention.

Like parts in FIGS. 4, 5A, 5B, 2, 3A and 3B are designated with like numerals throughout, and explanations about the parts found in the above description will be left out. The structural aspect of a disc drive as shown in FIG. 4 is similar as that of the disc drive as shown in FIG. 2 except that the restriction device used in each case is different from each other. Thus, explanation about the restriction device of the second embodiment of the present invention will be made by referring to FIGS. 5A and 5B.

Figure 5A:
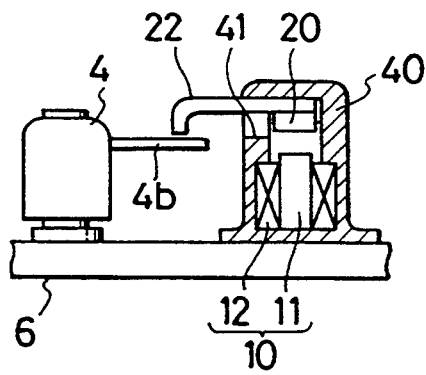
FIGS. 5A and 5B are side views illustrating the restriction device of the disc drive shown in FIG. 4, showing its release state and its restriction state, respectively.
Figure 5B:
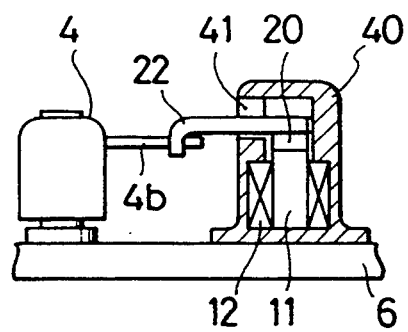

FIG. 5A shows a release state in which an arm 4 is released, and FIG. 5B shows a restriction state in which arm 4 illustrates is restricted. FIG. 4 arm 4 as constrained in FIG. 5B. A restriction device of the second embodiment of the present invention has a case 40 made of plastics and in which a fixed part and a movable part are installed. The fixed part is formed by an electromagnet 10 which has an iron core 11 shaped as a rod and composed of soft iron and has a coil 12 wrapped around the iron core 11. The electromagnet 10 is mounted or embeded within the case 40. The movable part is composed of a permanent magnet 20 have the movable direction guided by the case 40 in an up-and-down direction (FIGS. 5A and 5B) and a linking bar 22. One end of linking bar 27 is connected to the permanent magnet 20 and the other end is projected from a window 41 of the case 40. The material used for forming the permanent magnet 20 is preferably a metal alloy containing rare earth metals such as samarium cobalt. This would allow the permanent magnet 20 to be formed as a small-sized piece having a sufficient attractive force developed between the permanent magnet 20 and the iron core 11 of the electromagnet 10 so as to establish a finite restriction force. One end of the linking bar 22 is bent down as shown in FIGS. 5A and 5B so that the one end of the linking bar 22 may contact a linking bar 4b, which is linked to and extended from the arm 4. When the permanent magnet 20 is attracted by and contacted to the iron core 11.

In the second embodiment of the present invention, in operating the disc drive, the restriction device is at a release state where the electromagnet 10 is excited by an appropriate electric power source so that the electromagnet 10 and the permanent magnet 20 repel each other. Hence, the arm 4 may be operated arbitrarily by the actuator 5, and the head 3 located at a desirable position on the track zone TZ on the disc 1. In case the electric power input is lost in stopping the disc drive, or in case of an unexpected loss of the electric power source due to power failure, as described in the first embodiment of the present invention, the head 3 is moved quickly to the shipping zone SZ in a short period of time by operating the actuator 5 to move the arm 4 until the arm 4 reaches the stopper 4a shown in FIG. 4. At the same time, the electromagnet 10 becomes inactivated so that the permanent magnet 20 is attracted by the iron core 11 as shown in FIG. 5B, and therefore, the arm 4 is locked by contacting and linking the linking bar 22 and the linking bar 24. This restriction state is established while the disc drive is out of operation when the electromagnet 10 is not excited. The stopper 4a is formed by, for example, a small leaf spring as shown in FIG. 4, and the linking bar 4b may be formed by a fine metal string having sufficient elasticity.

In the modification of the above mentioned second embodiment of the present invention as shown in FIGS. 6A and 6B, there is no need to excite the electromagnet 10 while operating the disc drive by placing secondary iron cores 50 in the fixed part of the restriction device. FIGS. 6A and 6B illustrate only the restriction device where like parts of FIGS. 5A and 5B are designated with like numerals. FIGS. 6A and 6B show a release state and a restriction state of the arm 4, respectively.

The secondary iron core 50 is formed as a short-sized rod and made of soft magnetic material such as soft iron, and mounted or embedded on the upper side of the case 40, the position of which is opposite to that of the electromagnet 10. The overall configuration of the restriction device of the modification of the second embodiment is similar to the original second embodiment as shown in FIGS. 4, 5A and 5B.

In the above mentioned modification of the second embodiment of the present invention, at the beginning of the operation of the disc drive, the arm 4 can be set in a release state by exciting the electromagnet 10 so that the iron core 11 and the permanent magnet 20 repel each other. During the operation of the disc drive, the release state of the arm 4 is maintained by making the secondary iron core 50 attract the permanent magnet 20 by placing the electromagnet 10 in an unexcited state. In a similar manner to the original second embodiment, the disc drive is stopped or if there if an unexpected loss of the electric power to the disc drive, after moving the head 3 to the shipping zone SZ in a short period of time, a restriction state as shown in FIG. 6B is established by exciting the electromagnet 10 for a short period of time so that the electromagnet 10 attracts the permanent magnet 20. Afterwards, the restriction state is maintained by the permanent magnet which is attracted to and contacts the iron core 11 of the electromagnet 10, which is no longer excited. In exciting the electromagnet 10, the charge, stored in capacitors in a driving circuit while the disc drive is operated, may be discharged to generate the electric power to the electromagnet 10.

In the second embodiment and its modification as described above, a small-sized permanent magnet, having a 5–6 mm diameter and a 1–2 mm thickness, may be used to form the restriction device having a secured release and restriction work mode. In these above-mentioned embodiments, since the arm 4 does not swing over excessively, in comparing the prior art shown in FIG. 1C, the movement of the arm 4 is more smooth when at the release work mode, and the head 3 may be moved to a designated position within a relatively short period of time without making extra movement of the arm 4.

Next, referring to FIGS. 7, 8A and 8B, the third embodiment of the present invention will be described in the following. FIG. 7 illustrates a disc drive including a restriction device of the third embodiment. FIGS. 8A and 8B are magnified views of the restriction device, where like parts designated in FIGS. 2 to 6 are found in FIGS. 7, 8A and 8B with like numerals designated here and detailed explanations of them omitted. Different from the actuator used in the embodiments described above, an actuator 5 for moving an arm 4 in the third embodiment includes a sector-type voice coil. Any restriction device of the present invention may be effective regardless of the kind of the actuator. In FIG. 7, to emphasize the movable part 5b, a partial view of the fixed part 5a supporting the movable part 5b is omitted.

In the third embodiment of the present invention, if the disc drive is out of service or transported for shipping, to locate the head 3 in the shipping zone SZ, the arm 4 is fixed by the permanent magnet 20 and a magnet attraction part 60. The electromagnet 70 is used for releasing the arm 4. In the third embodiment as shown in FIGS. 7, 8A and 8B, the permanent magnet 20 is mounted on the case 6 and the magnet attraction part 60 is mounted on the arm 4. Alternatively, the permanent magnet 20 may be mounted on the arm 4, and the magnet attraction part 60 mounted on the case 6. In the following description, referring to the magnified views shown in FIGS. 8A and 8B, a detailed feature of the restriction device will be described. FIG. 8A corresponds to the restriction state of the arm 4 and FIG. 8B illustrates the release state of the arm 4.

The magnet attraction part 60 is a small piece of soft magnetic material such as soft iron, and fixed on one of two stems 4c that extend from the arm 4. Arm 4 supports the sector-type voice coil of the movable part 5b of the actuator 5. The permanent magnet 20 is a small piece of u-shaped magnetic material, as shown in FIG. 8A and 8B, and is mounted on a fitting part 24 through a rubber 23. Rubber 23 is used for buffering shocks. The fitting part 24 is screwed on the case 6 by a screw, not shown in FIG. 8A. The screw penetrates an elongated groove 24a in the fitting part 24. The relative position between the screw and the fitting part 24 is adjustable so that the gap between the magnet attraction part 60 and the permanent magnet 20 can be adjusted.

The electromagnet 70 is, for example, a plunger type magnet, comprising a fixed iron core 71, a movable iron core 72, a solenoid coil 73, a plunger bar 74 that guides the movable iron core 72 relative to the fixed iron core 71 in a vertical direction, a head part 75 attached to the one end of the plunger bar 74, and a coil spring 76 that urges the movable iron core 72 away from the fixed iron core 70. As shown in FIGS. 8A and 8B, the fixed iron core 71 is mounted at the end of the extended part 24b of the fitting part 24, and therefore, the fixed iron core 71 can be positioned relative to the permanent magnet 20 and mounted on the case 6. When the electromagnet 70 is not excited, the movable iron core 72 is urged by the coil spring 76 and moved in the right direction in FIG. 8A; the plunger bar 74 and the head part 75 are also moved so that the head part 75 contacts the fixed iron core 71. Further, if the electric power supply is removed or if there is an unexpected loss of the electric power source, by driving the actuator 5 using counter electromotive force by the inertially rotating spindle motor 2, the head 3 may be moved to the shipping zone SZ according to the movement of the arm 4. As a result, owing to the mechanical actions of those parts as shown above, the magnet attraction part 60 mounted on the arm 4 comes close to the permanent magnet 20, and by the magnetic attractive force developed between the magnet attraction part 60 and the permanent magnet 20, the magnet attraction part 60 and the permanent magnet 20 contacts each other. Thus, the arm 4 is fixed at the restriction state as shown in FIG. 8A. At this point, the electromagnet 70 is unexcited and its corresponding head part 75 is fixed at the position where the restriction work mode for the arm 4 is established. In addition, the rubber 23 buffers shocks when the magnet attraction part 60 collides with the permanent magnet 20, so that a restriction work mode of the arm 4 is positively established.

In starting the supply of the electric power source to the disc drive, similar to the embodiment shown in FIG. 2, the electromagnet 70 is excited in a short period of time. As shown in FIG. 8B, the head part 75 of the electromagnet 70 is pushed out by the plunger bar 74 and pushes the extended part 4c of the arm 4 so that the attractive force between the permanent magnet 20 and the magnet attraction part 60 is diminished and the arm 4 is be released from the restriction state. The magnetic attractive force between the permanent magnet 20 and the magnet attraction part 60 diminishes quickly once the gap between these magnets gets to a certain distance. Thus, the release work mode of the arm 4 can be performed by a small displacement of the arm 4. After the arm is released, the head 3 may be located at a desirable position on the track zone TZ on the disc 1 by applying a small amount of force to the arm 4 with the actuator 5.

In the third embodiment of the present invention, a plunger type electromagnet with a solenoid coil is used as the electromagnet 70. Other types of electromagnets with different structures from the electromagnet 70 may be used in order to perform the release and restriction work described above.

In every embodiment of the present invention described above, there is no need to make the actuator generate a large amount of driving force to cancel the pushing or pulling force developed by the coil spring as in the prior art shown in FIG. 1A. Since the electromagnet may be excited only in a short period of time at the beginning of the release work of the arm, the electric power needed to operate the restriction device is negligible. Furthermore, as there are few mechanical frictional parts in the restriction device, the restriction device can be used in long term operations under a stable condition for alternating restriction and release works.

Having above described preferred embodiments of the present invention, it will occur to those skilled in the art that modifications and alternatives can be practiced within the spirit of the invention. For example, though in the above mentioned embodiments the arm 4 is moved by the voice coil type motor, the arm may also move in a linear direction guided by a carriage and having a stepping motor actuator. Thus, the restriction device of the present invention can establish a more secured restriction work mode than that by the prior art device. In addition, though in the second embodiment of the present invention the permanent magnet 10 is always excited while the disc drive is operated, a small-sized repelling spring may be inserted between the electromagnet 10 and the permanent magnet 20 to excite the magnets only when a release work occurs, which leads to a reduction of electric power consumption of the disc drive.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A disc drive comprising:
   a fixed case;
   a disc rotatably mounted on said case;
   a motor for rotating said disc when electric power is applied to said motor;
   a movable member mounted on said case for movement with respect thereto in first and second opposite directions;

a head for writing information on and reading information from said disc, said head being supported by said movable member;

a driving means for moving said movable member over a given path, said driving means being coupled to said motor to receive a counter electromotive force generated by said motor following removal of electric power therefrom, whereby said counter electromotive force causes said driving means to move said movable member in said first direction over the given path to a predetermined position; and magnetic means comprising a permanent magnet and an electromagnet, one of said permanent magnet and said electromagnet being attached to said fixed case at said predetermined position and the other being attached to said movable member, said electromagnet being deenergized and said permanent magnet being attracted thereto to urge said movable member in said first direction when said movable member is at said predetermined position, and said electromagnet being energized to repel said permanent magnet to urge said movable member in said second direction when said electric power is restored.

2. A disc drive comprising:

a fixed case;

a disc rotatably mounted on said case;

a motor for rotating said disc when electric power is applied to said motor;

a movable member mounted on said case for movement with respect thereto in first and second opposite directions;

a head for writing information on and reading information from said disc, said head being supported by said movable member;

a driving means for moving said movable member over a given path, said driving means being coupled to said motor to receive a counter electromotive force generated by said motor following removal of electric power therefrom, whereby said counter electromotive force causes said driving means to move said movable member in said first direction over the given path to a predetermined position; and magnetic means comprising a permanent magnet and an electromagnet, said electromagnet being attached to said fixed case at said predetermined position and said permanent magnet being attached to said movable member, said electromagnet being deenergized and said permanent magnet attracted thereto to urge said movable member in said first direction when said movable member is at said predetermined position, and said electromagnet being energized to repel said permanent magnet to urge said movable member in said second direction when said electric power is restored.

3. A disc drive as claimed in claim 2, wherein said electromagnet is magnetically activated only at an instant when said movable member is released.

4. A disc drive as claimed in claim 2 further comprising a control circuit connected to a source of said electric power; and a switch coupled between said driving means and said motor, said switch being closed by said control circuit when electric power is removed from said motor thereby connecting the counter electromotive force generated by said motor to said driving means.

5. A disc drive as claimed in claim 4 further comprising a rectifier connected in series with said switch.

6. A disc drive as claimed in claim 4 further comprising an exciting circuit coupled between said control circuit and said electromagnet, said exciting circuit energizing said electromagnet when electric power is restored to said control circuit.

* * * * *